United States Patent
Chung et al.

(10) Patent No.: US 11,158,211 B2
(45) Date of Patent: Oct. 26, 2021

(54) CARDIOPULMONARY RESUSCITATION TRAINING APPARATUS AND CARDIOPULMONARY RESUSCITATION TRAINING EVALUATION METHOD

(71) Applicant: Innosonian Inc., Seoul (KR)

(72) Inventors: Mok Chung, Seoul (KR); Woong Hur, Seoul (KR); Nam Je Lee, Seoul (KR); Kwang Hee Choi, Gyeonggi-do (KR); Nam Hun Kim, Incheon (KR)

(73) Assignee: INNOSONIAN INC., Seoul (KR)

( * ) Notice: Subject to any disclaimer, the term of this patent is extended or adjusted under 35 U.S.C. 154(b) by 587 days.

(21) Appl. No.: 16/025,666

(22) Filed: Jul. 2, 2018

(65) Prior Publication Data
US 2019/0012933 A1    Jan. 10, 2019

(30) Foreign Application Priority Data

Jul. 4, 2017 (KR) .................. 10-2017-0084775
Jul. 4, 2017 (KR) .................. 10-2017-0084776

(51) Int. Cl.
*G09B 23/28* (2006.01)
*G09B 23/32* (2006.01)

(52) U.S. Cl.
CPC .......... *G09B 23/288* (2013.01); *G09B 23/32* (2013.01)

(58) Field of Classification Search
CPC ...... G09B 23/288; G09B 23/28; G09B 23/30; A61H 2201/5064; A61H 2201/5071
See application file for complete search history.

(56) References Cited

U.S. PATENT DOCUMENTS

| | | | | |
|---|---|---|---|---|
| 5,195,896 A | * | 3/1993 | Sweeney | G09B 23/288 434/265 |
| 2003/0022142 A1 | * | 1/2003 | Pastrick | G09B 23/288 434/265 |
| 2009/0035740 A1 | * | 2/2009 | Reed | G09B 23/288 434/265 |

(Continued)

FOREIGN PATENT DOCUMENTS

| | | |
|---|---|---|
| CN | 201465394 U | 5/2010 |
| CN | 106530922 A | 3/2017 |
| JP | 2013-511074 A | 3/2013 |

(Continued)

OTHER PUBLICATIONS (Video on YouTube) Brayden CPR Manikin, Mar. 6, 2016, https://www.youtube.com/watch?v=rFA5NbYPjvo.

(Continued)

*Primary Examiner* — Jerry-Daryl Fletcher
(74) *Attorney, Agent, or Firm* — Kacvinsky Daisak Bluni, PLLC

(57) ABSTRACT

Provided/Disclosed is a cardiopulmonary resuscitation (CPR) training apparatus, comprising: a mannequin including a head portion with an airway, and a body portion connected to the head portion; a compression portion provided in the body portion, the compression portion to be pressed in response to a chest compression; an airbag connected to the airway, the airbag configured to enable an artificial ventilation; and a measurer configured to measure a CPR performance state in response to the chest compression and the artificial ventilation performed on the mannequin.

10 Claims, 23 Drawing Sheets

(56) References Cited

U.S. PATENT DOCUMENTS

2014/0057235 A1    2/2014  Kellum et al.
2016/0335921 A1  11/2016  Chung et al.

FOREIGN PATENT DOCUMENTS

| JP | 2013511074 A | 3/2013 |
| KR | 1020120053727 A | 5/2012 |
| KR | 10-1232868 B1 | 2/2013 |
| KR | 101232868 B1 | 2/2013 |
| KR | 1020130037636 A | 4/2013 |
| KR | 1020150066988 A | 7/2016 |

OTHER PUBLICATIONS

Author Unknown., "Brayden Pro", Innosonian, Date Unknown. Acquired Oct. 15, 2018.
Author Unknown., "Brayden: Illuminating CPR", Brayden Manikin, Date Unknown. Acquired Oct. 15, 2018.

\* cited by examiner

| | | | |
|---|---|---|---|
| \multicolumn{4}{l}{Detailed result/CPR items} |
| \multicolumn{4}{l}{Trainee/ One rescuer/ Self-training} |

| Compression depth | Shallow | Adequate | Deep |
|---|---|---|---|
| | 7% | 93% | 0% |

| Release rate | Inadequate | Adequate | |
|---|---|---|---|
| | 0% | 100% | |

| Compression rate | Slow | Adequate | Fast |
|---|---|---|---|
| | 4% | 91% | 5% |

| Chest compression ratio score | Score |
|---|---|
| | 76 |

| Compression position | Inadequate | Adequate | |
|---|---|---|---|
| | 0% | 100% | |

| Compression count | Insufficient | Adequate | Excessive |
|---|---|---|---|
| | 0% | 100% | 0% |

| Ventilation amount | Insufficient | Adequate | Excessive |
|---|---|---|---|
| | 0% | 50% | 50% |

| Ventilation frequency | Slow | Adequate | Fast |
|---|---|---|---|
| | 0% | 100% | 0% |

CARDIOPULMONARY RESUSCITATION TRAINING APPARATUS AND CARDIOPULMONARY RESUSCITATION TRAINING EVALUATION METHOD

CROSS-REFERENCE TO RELATED APPLICATION(S)

This application claims the priority benefit of Korean Patent Application No. 10-2017-0084775 filed on Jul. 4, 2017 and Korean Patent Application No. 10-2017-0084776 filed on Jul. 4, 2017 in the Korean Intellectual Property Office, the disclosures of which are incorporated herein by reference for all purposes.

BACKGROUND

1. Field

One or more example embodiments relate to a cardiopulmonary resuscitation (CPR) training apparatus and a CPR training evaluation method using the same.

2. Description of Related Art

In general, CPR is a procedure to resuscitate a patient who has slowed or stopped cardiopulmonary function by restoring the cardiopulmonary function. For general CPR, a performer checks responsiveness, opens an airway, performs artificial ventilation, and provides cardiac massage to recover a cardiac function.

For CPR, it is important to open the airway after checking responsiveness by tapping shoulders of the patient. The airway is a respiratory track including a nasal cavity, an oral cavity, a pharynx, a larynx, bronchi, and lungs. When cardiac arrest or apnea happens, muscle tension of a tongue decreases, and the tongue blocks a pharyngeal area, which results in airway obstruction. Airway obstruction often results from consciousness disorder after cardiac arrest, apnea, head injury, or stroke happens.

To open the airway, the performer checks whether foreign materials such as vomitus are in the oral cavity and removes the materials. When the materials are removed, the performer lifts the neck with one hand, and tilts the head back by pressing the head with the other hand on the forehead.

When the airway is opened, the performer checks whether the patient is breathing. If the patient is not breathing, the performer performs artificial ventilation. Artificial ventilation refers to a procedure to artificially recover the function of the lungs to maintain normal respiration in case of suspended animation in which the patient is not breathing while the heart is still beating after drowning, poisoning, or bleeding.

Artificial ventilation is performed in two steps, an exhaling step by the performer exhaling air into the lungs of the patient and a manual ventilation step by the performer compressing a chest of the patient with the hands of the performer to aid inhalation and exhalation.

Such CPR is performed on a human body, and thus it is difficult for the performer to perform self-training repeatedly. Thus, in the past, a mannequin-shaped CPR training apparatus provided in a shape of a human body was used for CPR training. However, it was difficult to know whether the performer is performing CPR correctly.

Accordingly, there is a demand for a CPR training apparatus that enables a performer to intuitively check whether the performer is performing correct CPR during CPR training.

SUMMARY

An aspect provides a cardiopulmonary resuscitation (CPR) training apparatus and a CPR training evaluation method that may display a CPR performance state of a user in real time, thereby enabling effective CPR training for the user.

Another aspect also provides a CPR training apparatus and a CPR training evaluation method that may intuitively provide a user with a CPR performance state based on a position and a depth of chest compression.

According to an aspect, there is provided a cardiopulmonary resuscitation (CPR) training apparatus including a mannequin that includes a head portion with an airway and a body portion connected to the head portion, a compression portion provided in the body portion, the compression portion to be pressed in response to a chest compression, an airbag connected to the airway, the airbag configured to enable an artificial ventilation, and a measurer configured to measure a CPR performance state in response to the chest compression and the artificial ventilation performed on the mannequin.

The compression portion may include a compression plate provided in the body portion, an elastic body connected to the compression plate, the elastic body configured to provide a restoring force, a tilt detecting sensor installed on the compression plate, the tilt detecting sensor configured to detect a change in a tilt of the compression plate in response to the chest compression, and a position detecting sensor configured to detect a change in a relative position of the compression plate with respect to the body portion.

The CPR training apparatus may further include a magnetic substance and a magnetic field sensor configured to measure a change in a distance between the body portion and the compression plate in response to a change in a volume of the airbag.

The measurer may be configured to measure a position of the chest compression performed on the body portion through the tilt detecting sensor, and measure a rate and a depth of the chest compression performed on the body portion through the position detecting sensor.

The measurer may be configured to set a database determined based on the position and the depth of the chest compression performed on the body portion, obtain matching reference values by comparing a tilt value of the compression plate measured through the tilt detecting sensor and a position change value of the compression plate measured through the position detecting sensor to the database, and detect the position of the chest compression performed on the body portion based on the matching reference values.

The magnetic field sensor may be disposed on the compression plate, and the magnetic substance may be disposed on a front surface of the body portion, wherein the magnetic field sensor may be configured to detect a change in a magnetic field in response to the change in the volume of the airbag, and the measurer may be configured to measure a performance state of the artificial ventilation performed on the mannequin through the detected change in the magnetic field.

The CPR training apparatus may further include a contact protrusion provided on the compression plate, the contact protrusion configured to protrude toward a rear surface of the body portion, and a clicker disposed on an inner rear surface of the body portion, the clicker configured to produce a sound when in contact with the contact protrusion.

The CPR training apparatus may further include a communicator configured to transmit information measured by the measurer to an external server.

The CPR training apparatus may further include a display configured to display a virtual blood movement based on the CPR performance state, wherein the display may include a light emitting line including a plurality of light emitting diodes (LEDs) configured to sequentially emit light based on the measured CPR performance state.

The light emitting line may include a compression depth displaying line disposed to extend from a chest of the body portion toward both shoulders of the body portion, the compression depth displaying line configured to display a virtual cardiac output corresponding to the depth of the chest compression, and a blood circulation displaying line disposed to circulate through the body portion and the head portion, the blood circulation displaying line configured to display a virtual blood circulation corresponding to a performance state of the chest compression.

According to another aspect, there is provided a CPR training evaluation method through a CPR training apparatus, the CPR training evaluation method including obtaining CPR action information of a user in relation to a CPR action performed on the CPR training apparatus, providing a CPR performance state of the user in real time based on the obtained action information, and evaluating a CPR performance result of the user after CPR training is terminated.

The providing may include quantifying the obtained CPR action information, classifying the quantified action information for a plurality of set items, and converting the action information classified for each of the items into an index with respect to the CPR performance state and providing the index.

The converting may include converting chest compression action information of the quantified CPR action information into a distribution map with respect to a depth and a rate of chest compression, and cumulatively displaying indices with respect to chest compression actions performed by the user to be distinguished from each other.

The evaluating may include quantifying action information related to an action performed during a CPR training period, classifying the quantified action information for each set item, converting the action information classified for each item by applying a weight for each set item, and calculating a composite value with respect to the CPR performance result based on the converted action information for each item.

The evaluating may include providing a CPR graph sequentially showing an expected effect as time passes in response to each action of CPR performed by the user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 22 illustrates an example of a CPR performance result provided through a CPR training evaluation method according to an example embodiment.

DETAILED DESCRIPTION

Figure 1:
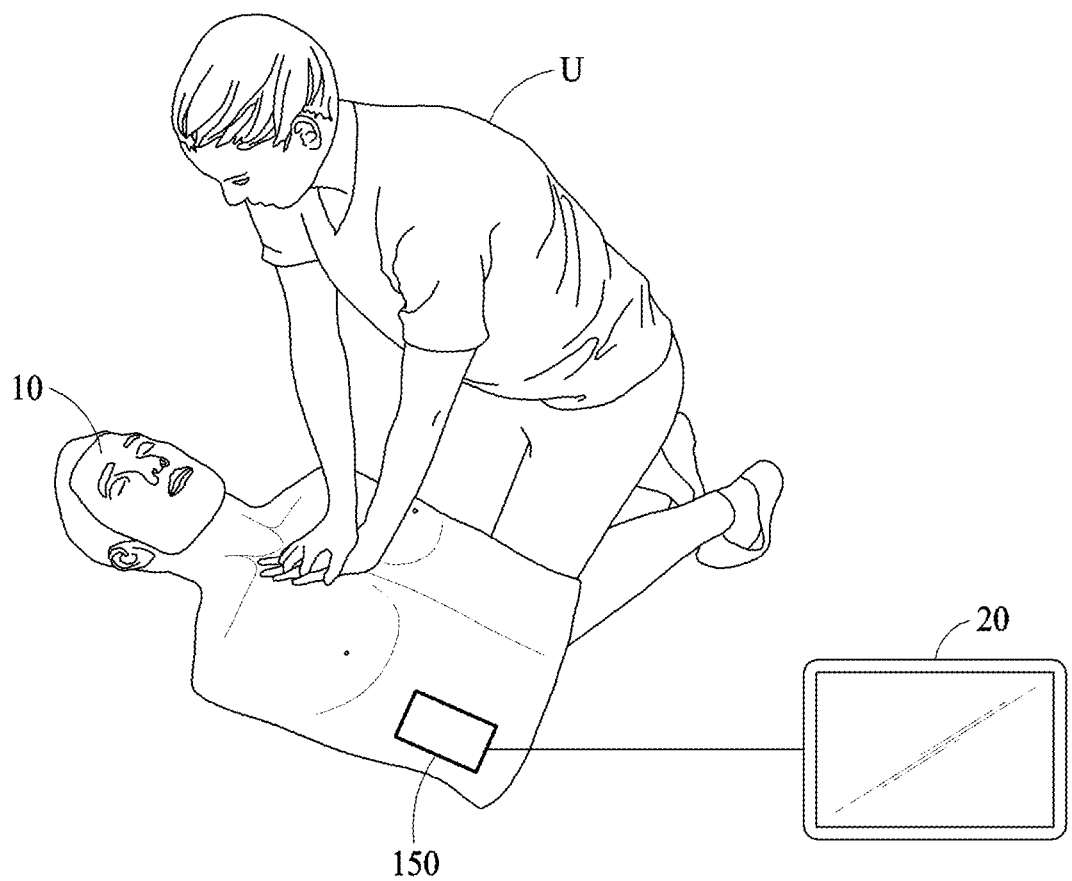
FIG. 1 illustrating an example of using a cardiopulmonary resuscitation (CPR) training system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 illustrating an example of using a cardiopulmonary resuscitation (CPR) training system according to an example embodiment.

Referring to FIG. 1, a CPR training system 1 may analyze a CPR training action performed by a user U in real time and provide an analysis result to the user U, thereby improving a CPR training level of the user U. For example, the CPR training system 1 may provide a result with respect to a CPR performance state in real time based on CPR action information related to a CPR action performed by the user U and provide an evaluation based on a performance result, thereby enabling the user U to intuitively verify a CPR performance level. The CPR training system 1 may include a CPR training apparatus 10, a communicator 150 and an evaluation apparatus 20.

The CPR training apparatus 10 may be used for CPR training of the user U.

Figure 2:
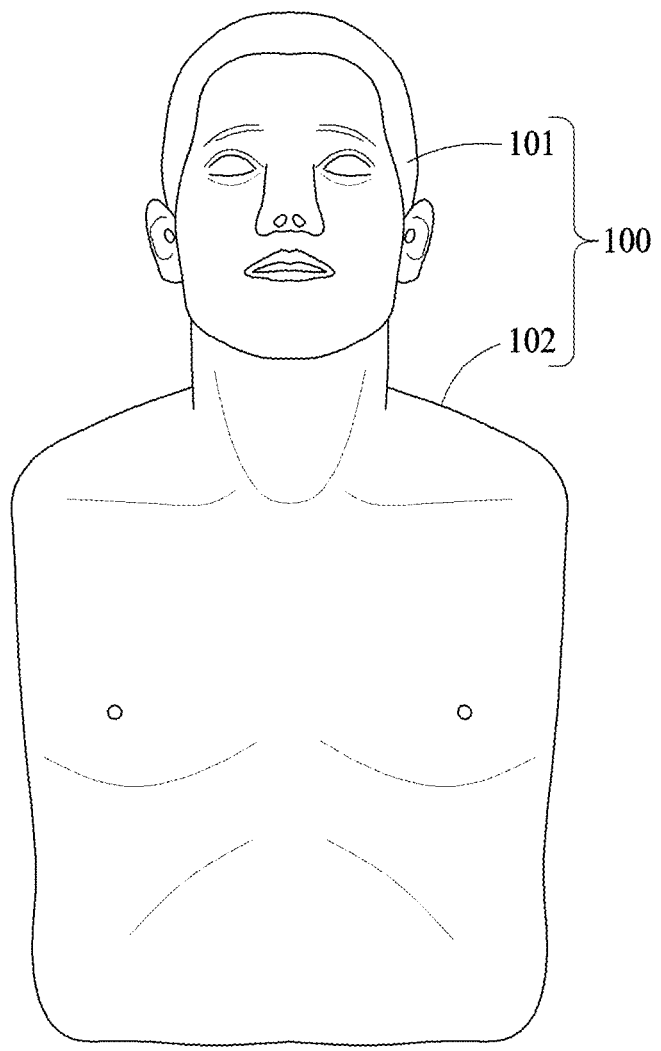
FIG. 2 is a top view of a CPR training apparatus according to an example embodiment.
Figure 3:
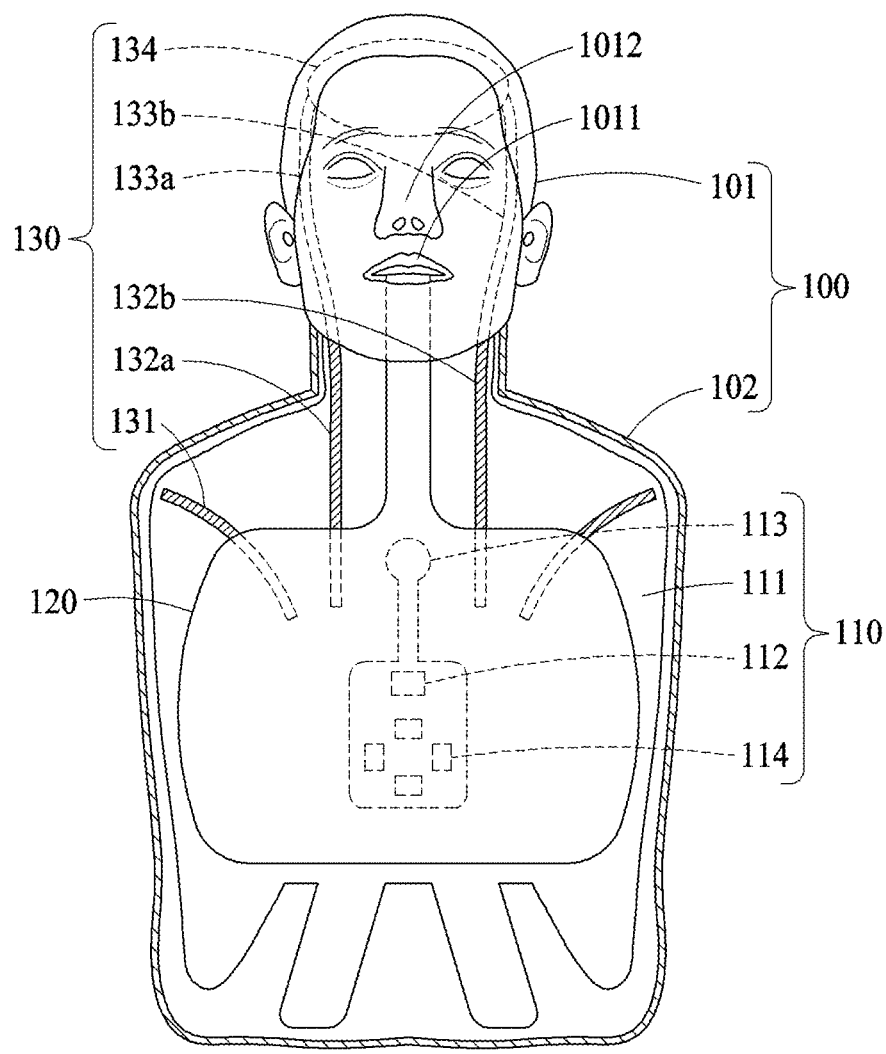
FIG. 3 is a see-through top view of a CPR training apparatus according to an example embodiment.
Figure 4:
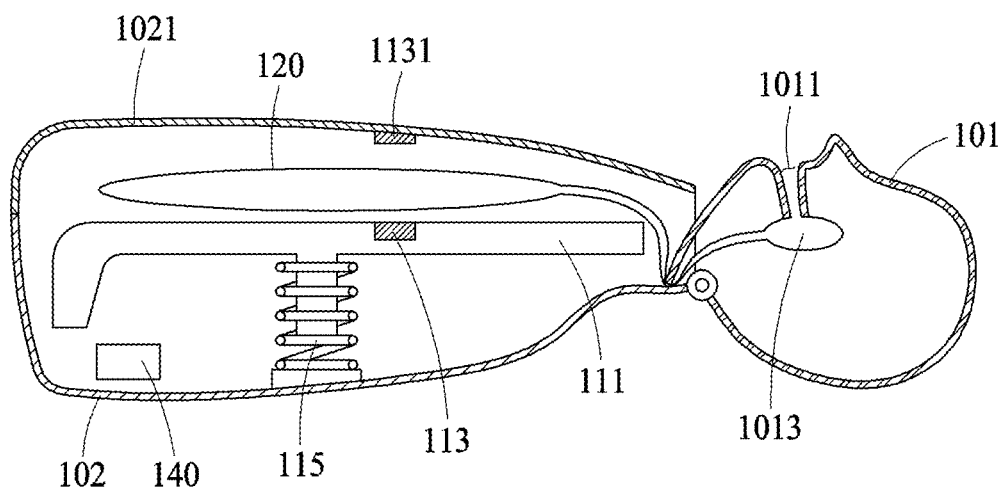
FIG. 4 is a side cross-sectional view of a CPR training apparatus according to an example embodiment.
Figure 5:
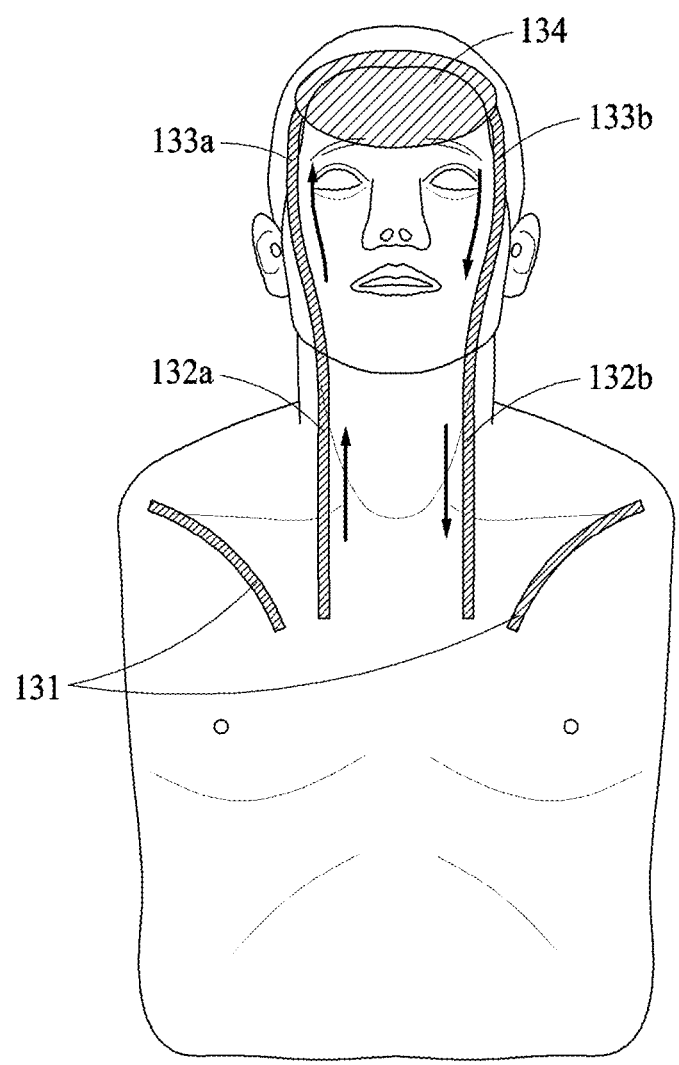
FIG. 5 is a view illustrating a display according to an example embodiment.
Figure 6:
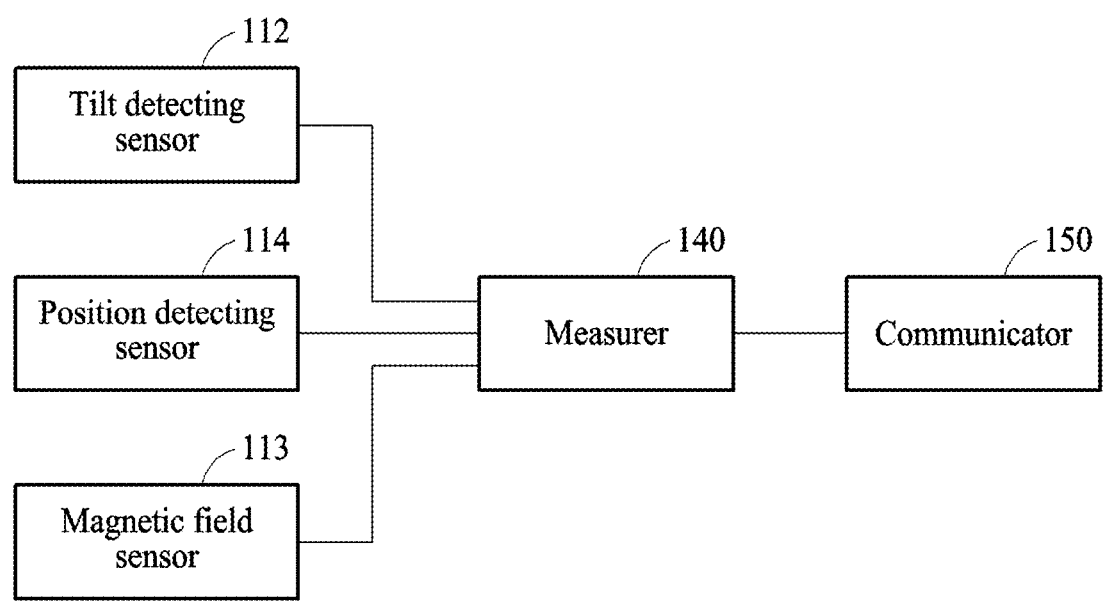
FIG. 6 is a block diagram of a CPR training apparatus according to an example embodiment.
Figure 7:
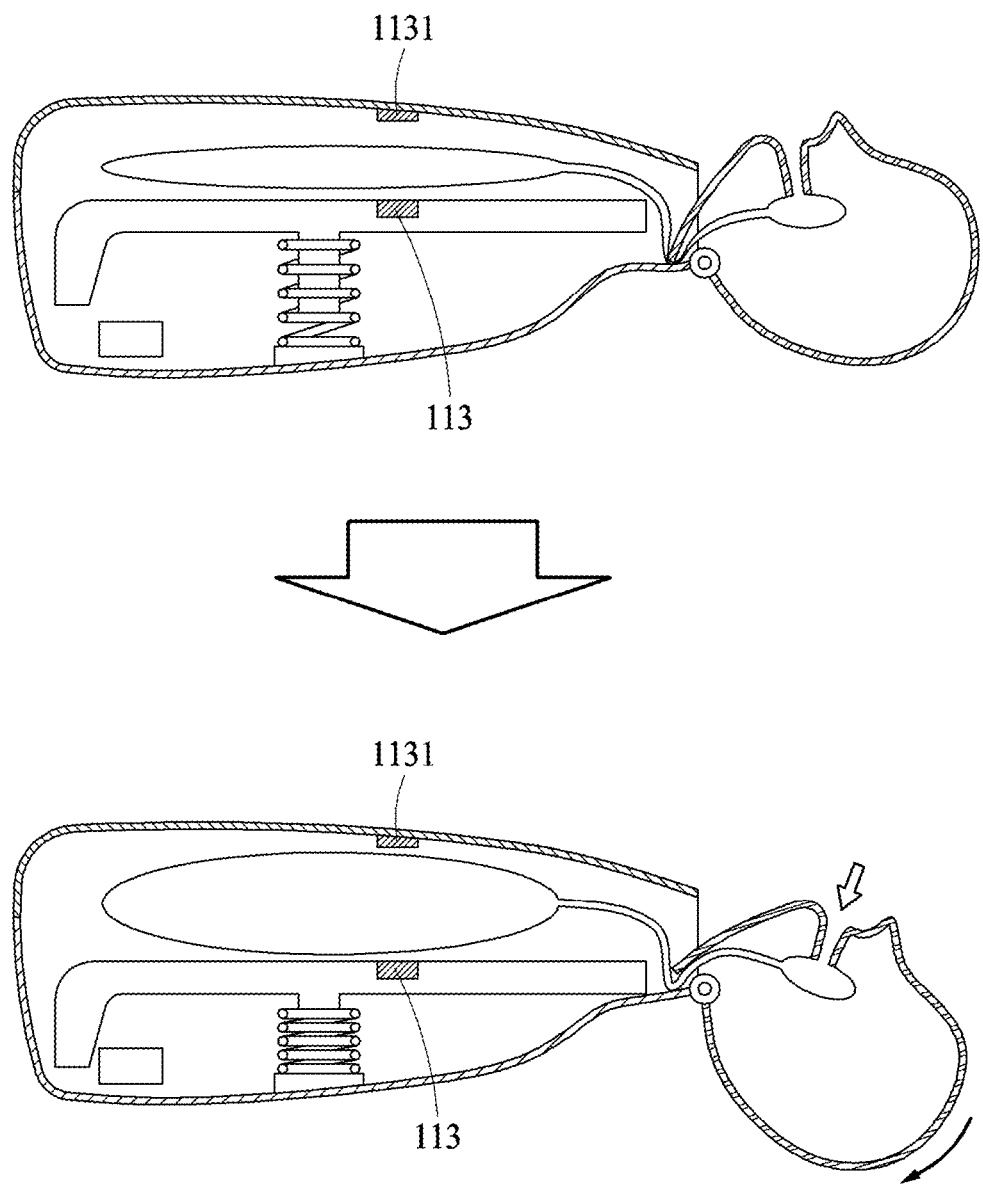
FIG. 7 illustrates an operation of a CPR training apparatus according to an example embodiment.
Figure 8:
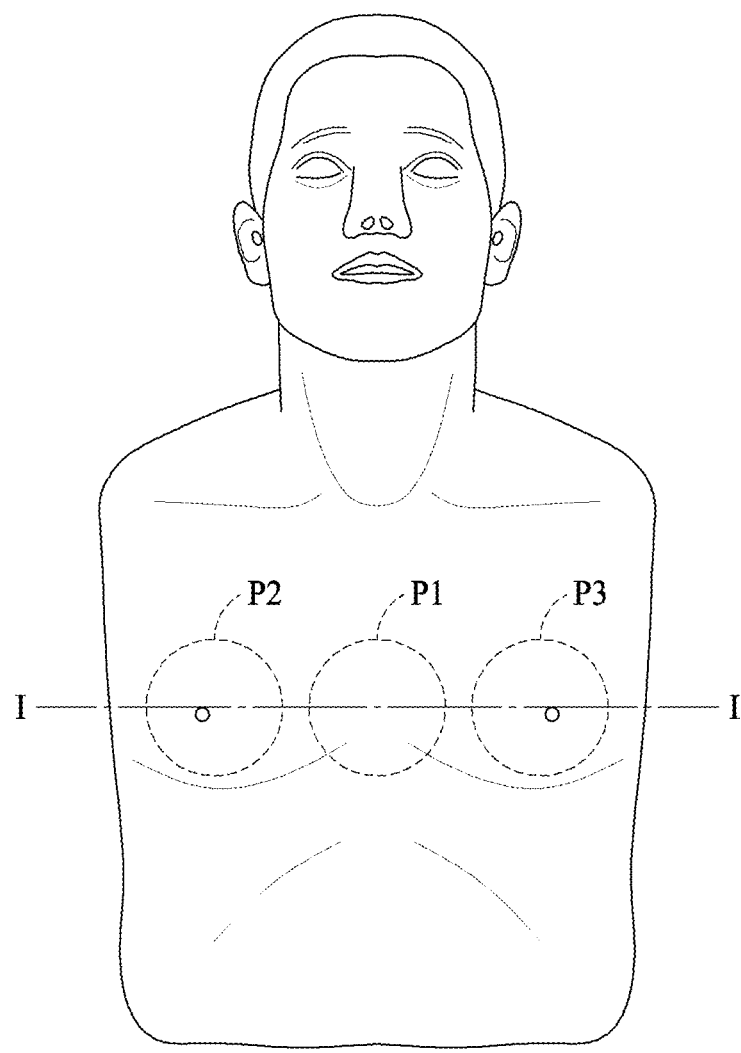
FIG. 8 illustrates a position of chest compression performed on a CPR training apparatus according to an example embodiment.
Figure 9:
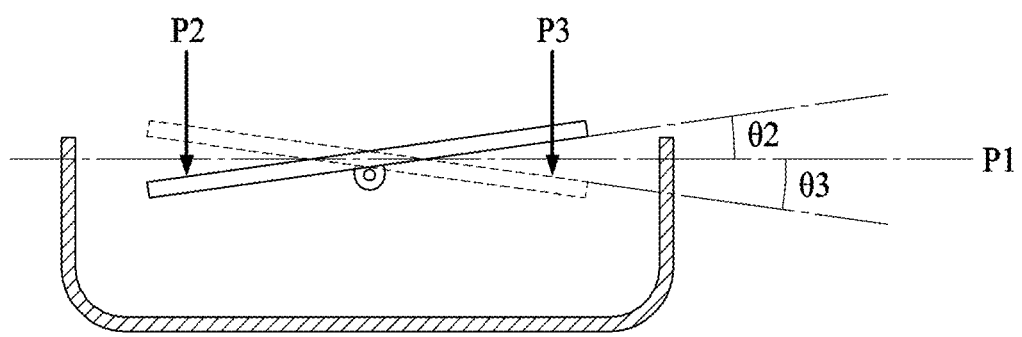
FIG. 9 illustrates an operating process of a tilt detecting sensor with respect to the position of chest compression of FIG. 8.

FIG. 2 is a top view of a CPR training apparatus according to an example embodiment, FIG. 3 is a see-through top view of the CPR training apparatus according to an example embodiment, FIG. 4 is a side cross-sectional view of the CPR training apparatus according to an example embodiment, FIG. 5 is a view illustrating a display according to an example embodiment, FIG. 6 is a block diagram of the CPR training apparatus according to an example embodiment, FIG. 7 illustrates an operation of the CPR training apparatus according to an example embodiment, FIG. 8 illustrates a position of chest compression performed on the CPR training apparatus according to an example embodiment, and FIG. 9 illustrates an operating process of a tilt detecting sensor with respect to the position of chest compression of FIG. 8.

Referring to FIGS. 2 through 4, the CPR training apparatus 10 may include a mannequin 100, a compression portion 110, an airbag 120, a measurer 140 and a display 130.

The mannequin 100 may be formed like a human body such that a user may experience a feeling like performing CPR on a real human body. For example, the mannequin 100 may have a shape similar to a standard body shape of a human and include a skin of a silicon or urethan material to have a skin texture similar to an elasticity of a real skin. The mannequin 100 may be formed of a light-transmissive material, thereby enabling light emitted by the display 130, which will be described later, to be recognized outside. The mannequin 100 may include a head portion 101 and a body portion 102.

The head portion 101 may include an airway 1013 through which artificial ventilation may be performed. For example, the head portion 101 may include a mouth with an oral cavity 1011 and a nose with a nasal cavity 1012. The oral cavity 1011 and the nasal cavity 1012 may communicate with each other, thereby forming the airway 1013 in the head portion 101. The airway 1013 may extend to a chin of the head portion 101 and be connected to the airbag 120, which will be described later. An extension of the airway 1013 may include a valve which is opened only when a predetermined or higher pressure is applied. By the above structure, in a case of performing artificial ventilation through the oral cavity 1011, air injected into the airway 1013 may leak through the nasal cavity 1012. Thus, in a case in which the user performs artificial ventilation, the user may be induced to perform artificial ventilation while closing the nasal cavity 1012.

The head portion 101 may realize a joint motion similar to that of a human body. For example, the head portion 101 may be back and forth rotatably connected to the body portion 102. That is, the head portion 101 may be tilted by the user back and forth with respect to the body portion 102. In this example, only when the head portion 101 is tilted back with respect to the body portion 102, the airway 1013 may be opened such that the air injected into the airway 1013 may move into the airbag 120. As a result, the CPR training apparatus 10 may induce the user to open the airway 1013 by tilting the head portion 101 and perform artificial ventilation when the user performs CPR.

The body portion 102 may be formed to have an appearance similar to an upper body of a human. For example, the body portion 102 may include a xiphoid process, ribs, and nipples on an outer surface thereof. By the above structure, in a case in which the user performs a chest compression on the body portion 102, the user may verify an exact position for the chest compression through the outer surface of the body portion 102.

The compression portion 110 may be provided in the body portion 102 such that the user may perform a chest compression action on the body portion 102. The compression portion 110 may include a compression plate 111, an elastic body 115, a tilt detecting sensor 112 and a position detecting sensor 114.

The compression plate 111 may be disposed in the body portion 102 to be pressed in response to the chest compression performed on the body portion 102. The compression plate 111 may perform a function similar to that of ribs of a human body. For example, the compression plate 111 may be pressed in a direction of a rear surface of the body portion 102, that is, toward a back of the body portion 102, in response to the chest compression or artificial ventilation performed on a mannequin.

The elastic body 115 may provide a restoring force to return the compression plate 111 to its original position. The elastic body 115 may be disposed between the rear surface of the body portion 102 and the compression plate 111, and store elastic energy (potential energy) in response to the chest compression applied to the compression plate 111. The elastic body 115 may apply the energy to the compression plate 111 such that the compression plate 111 may be pressed in a direction of a front surface of the body portion 102, thereby returning the compression plate 111 to its original position with respect to the body portion 102. By the above structure, when the chest compression on the body portion 102 is released, the compression plate 111 may be returned to its original position by the elastic body 115. Thus, the user may repeatedly perform the chest compression action on the body portion 102.

The tilt detecting sensor 112 may detect a change in a tilt of the compression plate 111 in response to the chest compression. For example, based on a position of the chest compression performed by the user with respect to the body portion 102, a compression position of the compression plate 111 may be changed. In this example, the tilt of the compression plate 111 with respect to the body portion 102 may be changed based on the compression position. The tilt detecting sensor 112 may be disposed at a predetermined position on the compression plate 111, and detect the change in the tilt of the compression plate 111 in response to the chest compression, thereby obtaining information related to the position of the chest compression performed on the body portion 102. Tilt change information of the compression plate 111 obtained by the tilt detecting sensor 112 may be transmitted to the measurer 140, which will be described later. The tilt detecting sensor 112 may be disposed at a center of the compression plate 111 which has a bilateral symmetry as in FIG. 3. However, example embodiments are not limited thereto, and an arrangement position of the tilt detecting sensor 112 with respect to the compression plate 111 is not limited thereto.

The position detecting sensor 114 may detect a change in the position of the compression plate 111 with respect to the body portion 102. For example, based on a depth of the chest compression performed by the user with respect to the body portion 102, a compression level of the compression plate 111 with respect to the body portion 102 may be changed. As an intensity of the chest compression is relatively great, the compression plate 111 may move relatively further in a direction of the rear surface of the body portion 102, that is, the back of the body portion 102. Thus, the position detecting sensor 114 may measure a change in a relative position of the compression plate 111 with respect to the body portion 102. That is, the position detecting sensor 114 may measure a compression depth of the compression plate 111 that is changed based on the depth of the chest compression. The position detecting sensor 114 may be, for example, a displacement sensor that measures a distance between the compression plate 111 and the rear surface of the body portion 102. However, a type and a position detecting scheme of the position detecting sensor 114 are not limited thereto. Various sensors capable of measuring a change in the relative position of the compression plate 111 with respect to the body portion 102 may be applied to the position detecting sensor 114.

The compression portion 110 may include a clicker that operates to produce a sound when the compression plate 111 is pressed deeper than a predetermined depth. For example, the compression plate 111 may include a contact protrusion protruding in a direction of the rear surface of the body portion 102, and the clicker that operates when in contact with the contact protrusion may be disposed in an inner rear surface of the body portion 102. When the compression plate 111 is pressed deeper than the predetermined depth, the clicker may be in contact with the contact protrusion and produce a sound. By the above structure, an operation of the clicker may intuitively indicate that the user is performing the chest compression excessively.

The airbag 120 may be connected to the airway 1013 such that artificial ventilation on the mannequin may be enabled. The airbag 120 may store the air injected by the user through the airway 1013 such that a volume thereof may be changed. The airbag 120 may be disposed between the compression plate 111 and the body portion 102. For example, as shown in FIG. 4, the airbag 120 may be disposed between the compression plate 111 and an inner front surface of the body portion 102. The airbag 120 may be inflated as the air is injected through the airway 1013 such that a distance between the front surface of the body portion 102 and the compression plate 111 may increase. The airbag 120 may be pressed and discharge the air in response to the chest compression being performed such that the distance between the front surface of the body portion 102 and the compression plate 111 may decrease. Thus, the airbag 120 may realize a thoracic motion of a human body in response to the performance of CPR.

The measurer 140 may measure performance states of the chest compression and the artificial ventilation performed on the CPR training apparatus 10. For example, the measurer 140 may measure the chest compression performance state of the user in real time based on data measured at the compression portion 110. The measurer 140 may measure the position of the chest compression performed on the body portion 102 based on a change in the tilt of the compression plate 111 measured by the tilt detecting sensor 112, and measure the depth and the rate of the chest compression performed on the body portion 102 through the position detecting sensor 114. For example, the measurer 140 may set values corresponding to the tilt of the compression plate 111 and the relative position of the compression plate 111 with respect to the body portion 102, and include a database related to the position of the chest compression based on the set values. The measurer 140 may correct the tilt of the compression plate 111 measured by the tilt detecting sensor 112 based on a value measured by the position detecting sensor 114, and compare the corrected value to the database related to the position of the chest compression, thereby measuring the position of the chest compression performed by the user with respect to the body portion 102.

The measurer 140 may measure the performance state of the artificial ventilation performed by the user through the airway 1013 based on a change in the volume of the airbag 120. For example, the measurer 140 may measure an amount and a flow rate of the air injected into the airbag 120 through the artificial ventilation based on information related to a change in the distance between the compression plate 111 and the body portion 102 that changes in response to the change in the volume of the airbag 120. In this example, a magnetic field sensor 113 and a magnetic substance 1131 may be provided on the compression plate 111 and the front surface of the body portion 102, respectively. When a distance between the magnetic field sensor 113 and the magnetic substance 1131 changes in response to the change in the volume of the airbag 120, a strength of a magnetic field detected by the magnetic field sensor 113 may change, and thus the measurer 140 may measure a degree and a rate of the change in the volume of the airbag 120 based on a variance in the strength of the magnetic field.

The display 130 may display the CPR performance state for the user. For example, the display 130 may display a virtual blood movement corresponding to the CPR performance state measured by the measurer 140, thereby enabling the user to intuitively recognize a CPR performance level.

Referring to FIG. 5, the display 130 may display the virtual blood movement corresponding to the CPR performance state measured by the measurer 140 through a light emitting line including a plurality of light emitting diodes (LEDs). For example, the plurality of LEDs may have light emitting intensities, light emitting colors, and flickering rates that change based on the CPR performance state, thereby displaying the CPR performance state for the user in real time.

The light emitting line may include a compression depth displaying line 131 that displays a virtual cardiac output in response to CPR, and a blood circulation displaying line that displays a virtual blood circulation.

The compression depth displaying line 131 may be disposed to extend from a chest of the body portion 102 to both shoulders of the body portion 102. For example, the compression depth displaying line 131 may be provided on the compression plate 111. The LEDs of the compression depth displaying line 131 may sequentially emit light in a direction from the chest to the shoulders of the body portion 102 based on a measured compression depth of the compression plate 111, thereby displaying whether the user is performing the chest compression to an adequate depth in real time. Thus, the user may intuitively recognize whether the chest compression action is being performed to a correct depth through the light emitting intensity of the compression depth displaying line 131.

The blood circulation displaying line may emit light sequentially in an order of a first circulation line 132a, 133a, a normal circulation displaying line 134 and a second circulation line 132b, 133b, in response to the chest compression action performed on the body portion 102. The blood circulation displaying line may display a blood circulation process of a human body corresponding to the chest compression action for the user. In this example, the first circulation line 132a and the second circulation line 132b may display a virtual blood movement corresponding to the chest compression action of the user through the flickering rates of the LEDs disposed in succession.

Meanwhile, the blood circulation displaying line may operate such that the first circulation line 132a, 133a and the second circulation line 132b, 133b may emit light sequentially in a direction from the body portion 102 to the head portion 101 in response to the chest compression performed by the user. However, the above scheme of controlling light emission of the blood circulation displaying line is merely an example. A light emitting position and a sequential light emitting direction of each LED of the blood circulation displaying line may vary.

The normal circulation displaying line 134 may emit light of different colors based on a level of the chest compression performed on the body portion 102. For example, the normal circulation displaying line 134 may operate such that red LEDs emit light when the rate and the compression level of the chest compression are less than set reference values, green LEDs emit light when the rate and the compression level of the chest compression reach the set reference values, and yellow LEDs emit light when the chest compression is performed excessively with the rate and the compression level exceeding the set reference values. However, the colors of the light emitted through the LEDs in response to the chest compression being performed are merely an example. Various schemes of providing the user with the chest compression performance state may be applied to the normal circulation displaying line 134.

Referring to FIG. 6, the measurer 140 may obtain information related to the CPR action performed by the user from the information obtained through the tilt detecting sensor 112, the position detecting sensor 114 and the magnetic field sensor 113. The communicator 150 may transmit the information measured by the measurer 140 to an external server.

The external server may be, for example, an evaluation apparatus capable of receiving a CPR performance result measured by the measurer 140, or a personal terminal of the user.

For example, the evaluation apparatus may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device (for example, a head-mounted-device (HMD) like electronic glasses, electronic cloth, an electronic bracelet, an electronic necklace, an electronic appcessory, an electronic tattoo or a smart watch).

The evaluation apparatus 20 may analyze the CPR performance state of the user based on the information received from the communicator 150, and provide the analyzed CPR performance state to the user in real time. When the user completes CPR training, the evaluation apparatus 20 may evaluate the CPR performance result of the user and provide the evaluated result to the user.

Referring to FIG. 7, the CPR training apparatus 10 may induce an action of the user such that the user may experience a feeling like performing artificial ventilation on a real human body.

Only when the head portion 101 is tilted back with respect to the body portion 102, the airway 1013 may be opened such that the air may be injected into the airbag 120 in response to the artificial ventilation. For example, in a case in which the user does not tilt the head portion 101 back with respect to the body portion 102, a chin of the head portion 101 may press a tube connecting the airbag 120 and the airway 1013 such that the air may not be injected into the airbag 120 in response to the artificial ventilation. By the above structure, the CPR training apparatus 10 may induce the user to perform an action of opening the airway 1013 in the mannequin 100 when the user performs the artificial ventilation.

In response to the artificial ventilation being performed after the airway 1013 is opened, the air injected into the airway 1013 may move into the airbag 120 and inflate the airbag 120. When the airbag 120 is inflated, the airbag 120 may press the compression plate 111 toward the rear surface of the body portion 102 and simultaneously press the chest of the body portion 102 forward. Thus, the CPR training apparatus 10 may produce an effect of the chest inflating like a real movement of a human body when the artificial ventilation is performed.

When the airbag 120 is inflated, the distance between the front surface of the body portion 102 and the compression plate 111 may be changed. That is, the distance between the front surface of the body portion 102 and the compression plate 111 may increase. In this example, the magnetic field sensor 113 and the magnetic substance 1131 may be provided on the compression plate 111 and the front surface of the body portion 102, respectively. However, on the contrary, the magnetic substance 1131 may be disposed on the compression plate 111 and the magnetic field sensor 113 may be disposed on the front surface of the body portion 102. When the distance between the compression plate 111 and the front surface of the body portion 102 is changed, a strength of a magnetic field measured by the magnetic field sensor 113 may be changed, and thus the measurer 140 may obtain information such as an amount and an injection rate of the air injected into the airbag 120 based on a value measured by the magnetic field sensor 113.

Referring to FIGS. 8 and 9, the CPR training apparatus 10 may detect the position of the chest compression of the user through the tilt detecting sensor 112. Based on the position of the chest compression performed on the body portion 102 as shown in FIG. 8, the tilt of the compression plate 111 may be changed as shown in FIG. 9. For example, in a case of pressing a left side and a right side of the compression plate 111 when compared to a case of pressing a center of the compression plate 111, the compression plate 111 may be tilted at angles of θ2 and θ3, respectively. As a distance between the compression position and the center of the compression plate 111 increases, a variance in the tilt of the compression plate 111 may increase. Further, as the compression level of the compression plate 111 increases, the variance in the tilt of the compression plate 111 may increase. Thus, the tilt detecting sensor 112 may detect the variance in the tilt of the compression plate 111, thereby detecting information related to the chest compression action performed by the user.

The measurer 140 may measure the position of the chest compression performed by the user with respect to the body portion 102 based on the variance in the tilt of the compression plate 111 detected by the tilt detecting sensor 112. Since the variance in the tilt of the compression plate 111 may be changed based on an intensity of the chest compression performed by the user, the measurer 140 may correct the tilt value of the compression plate 111 detected through the tilt detecting sensor 112 with a variance in the position of the compression plate 111 detected through the position detecting sensor 114, thereby obtaining the accurate position of the chest compression performed on the body portion 102.

Figure 10:
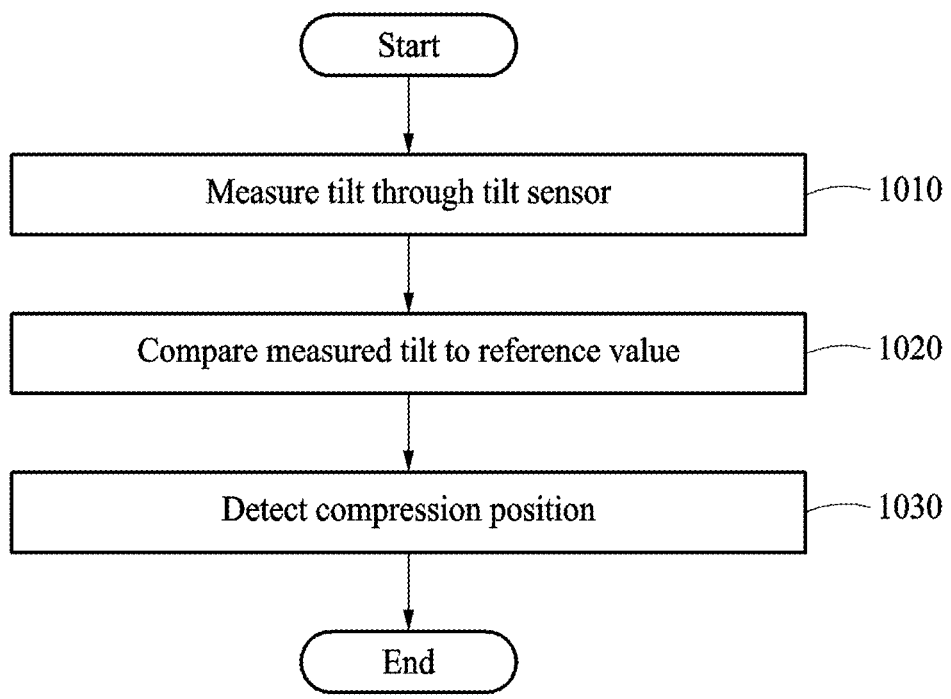
FIG. 10 is a flowchart illustrating an operation of a measurer according to an example embodiment.

FIG. 10 is a flowchart illustrating an operation of a measurer according to an example embodiment.

Referring to FIG. 10, a CPR training apparatus may operate through an operation of measuring a tilt through a tilt detecting sensor, an operation of comparing the measured tilt to a reference value, and an operation of detecting a position of chest compression.

In operation 1010, the measurer may obtain a variance in a tilt of a compression plate through a tilt detecting sensor. The variance in the tilt of the compression plate measured through the tilt detecting sensor may be provided to the measurer. The measurer may simultaneously obtain the variance in the tilt of the compression plate through a position detecting sensor.

In operation 1020, the measurer may compare the measured tilt to a set reference value. For example, the reference value may be a database including values determined based on positions of chest compressions applied to a body portion. The database may include information related to the positions of the chest compressions with respect to the body portion, which is determined based on a change in a distance between the body portion and the compression plate and the tilt of the compression plate.

The measurer may obtain matching reference values by comparing the detected tilt value of the compression plate and the relative distance value of the compression plate with respect to the body portion to the database.

In operation 1030, the measurer may detect an expected position of the chest compression of the user based on the obtained reference values.

Hereinafter, a method of evaluating a CPR performance state of the user performing CPR through the CPR training apparatus will be described. The CPR training evaluation method may be performed by an evaluation apparatus. An application interoperating with the CPR training apparatus may be installed in the evaluation apparatus. Meanwhile, the CPR training evaluation method may be performed by the evaluation apparatus. However, a subject performing the CPR training evaluation method is not limited thereto. That is, any apparatus capable of executing at least one program including instructions to perform the CPR training evaluation method may be the subject performing the CPR training evaluation method.

Figure 11:
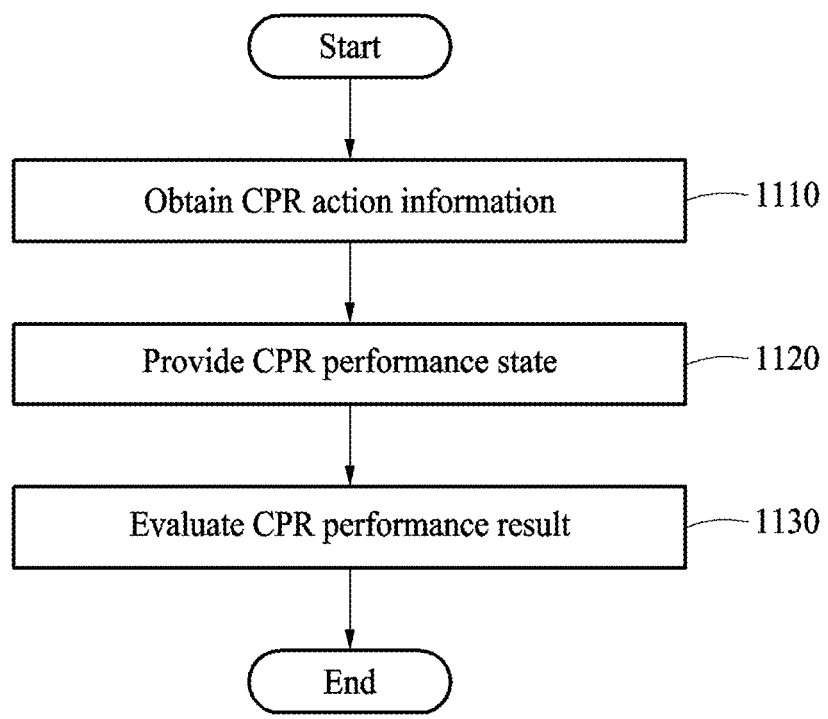
FIG. 11 is a flowchart illustrating a CPR training evaluation method according to an example embodiment.
Figure 12:
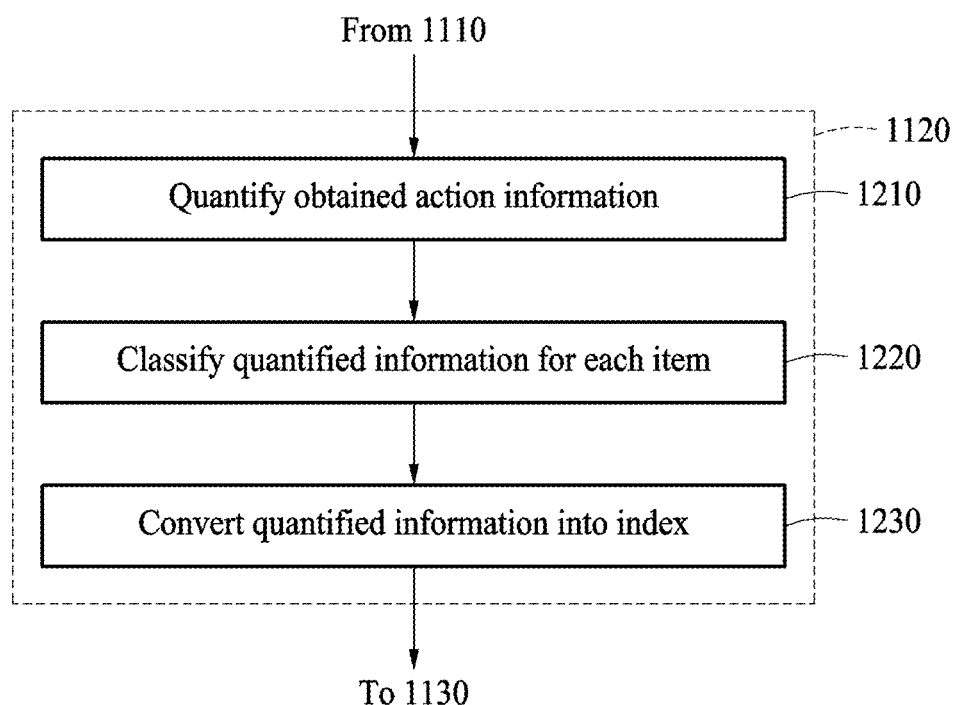
FIG. 12 is a flowchart illustrating an example of providing a CPR performance state according to an example embodiment.
Figure 13:
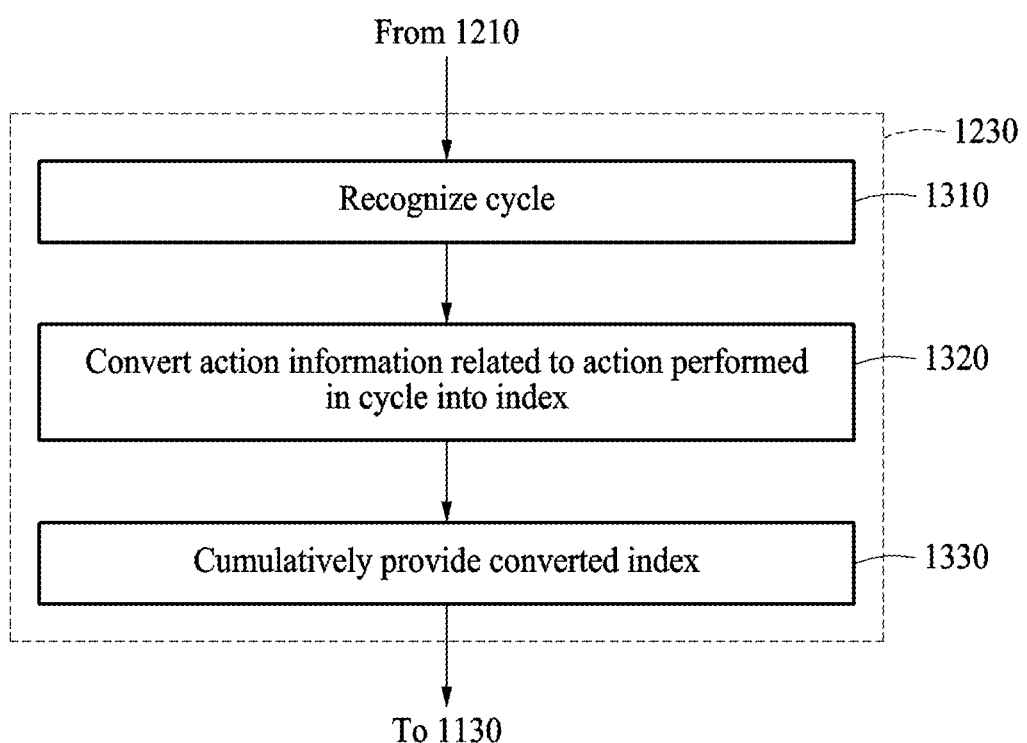
FIG. 13 is a flowchart illustrating an example of index conversion according to an example embodiment.
Figure 14:
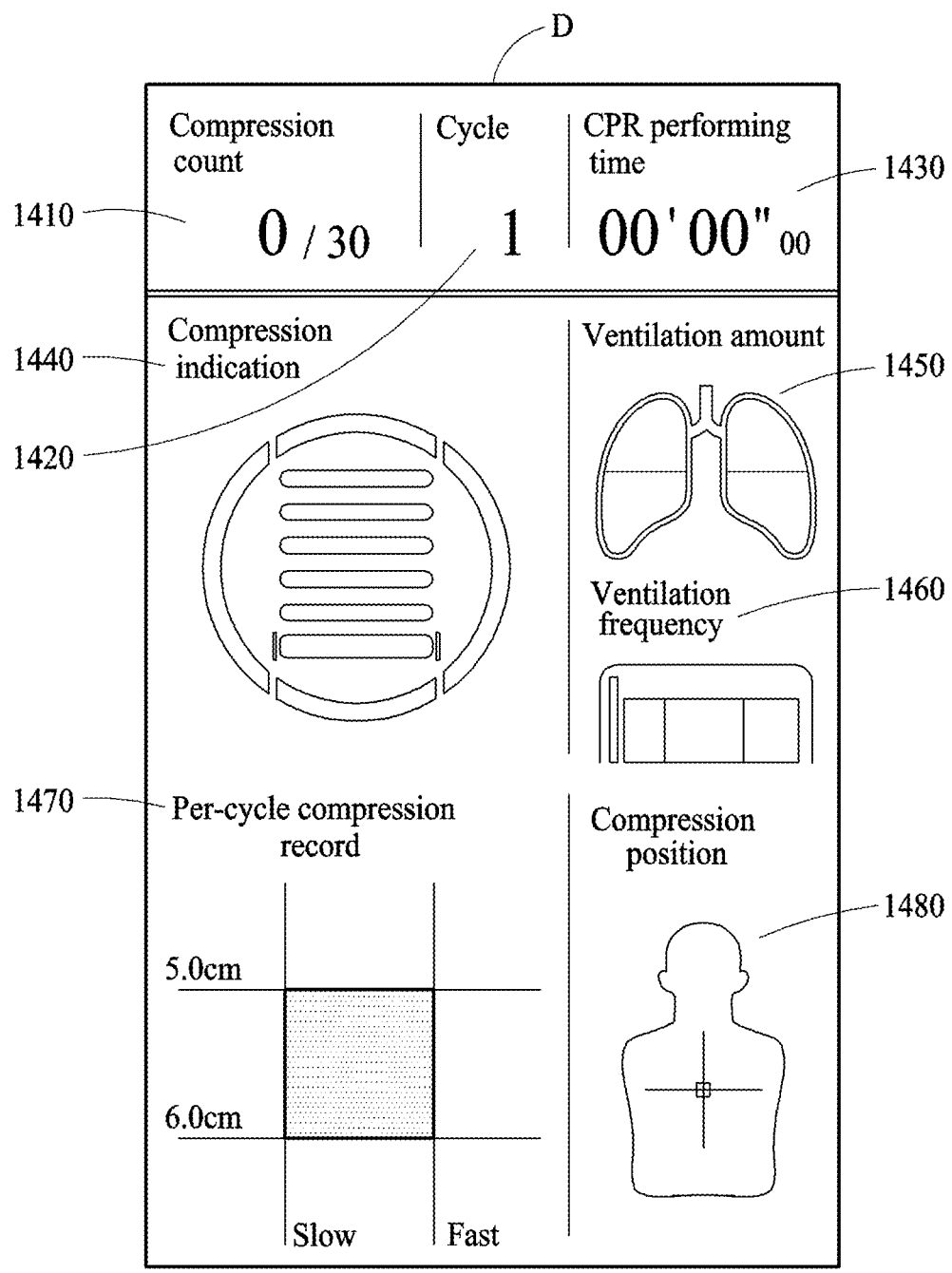
FIG. 14 illustrates an example of a CPR performance state provided through a CPR training evaluation method according to an example embodiment.
Figure 15:
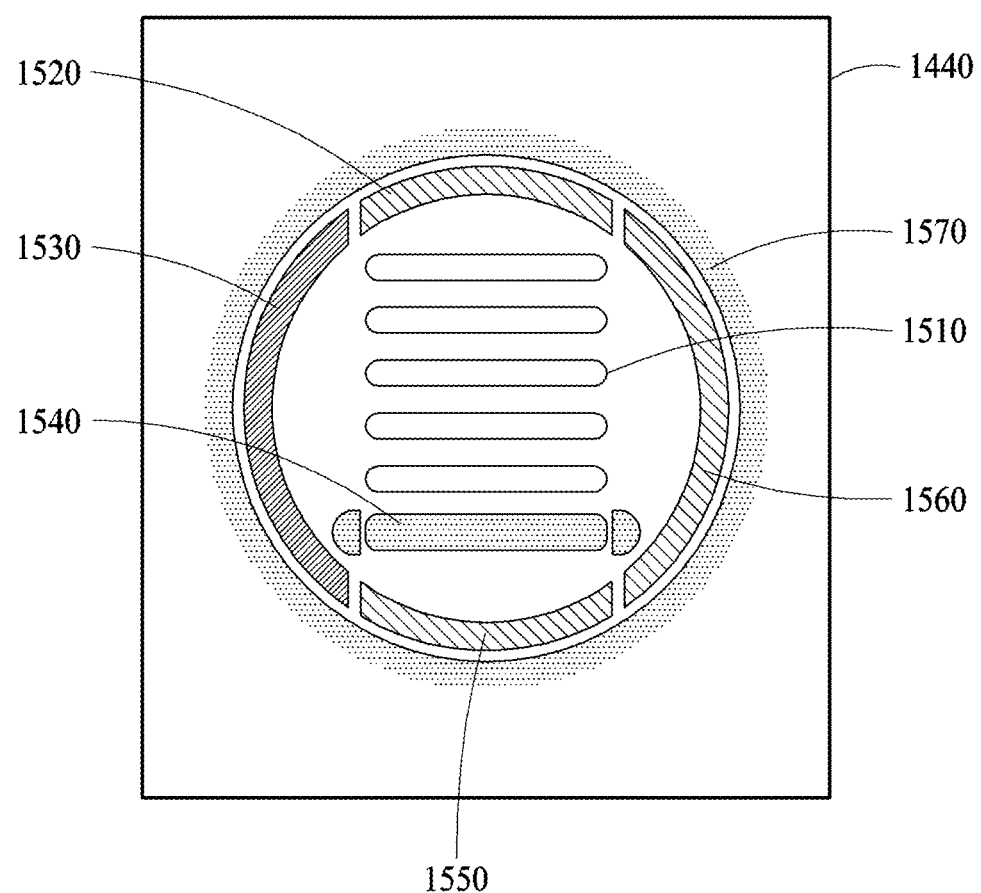
FIG. 15 illustrates an example of a chest compression performance state index provided through a CPR training evaluation method according to an example embodiment.
Figure 16:
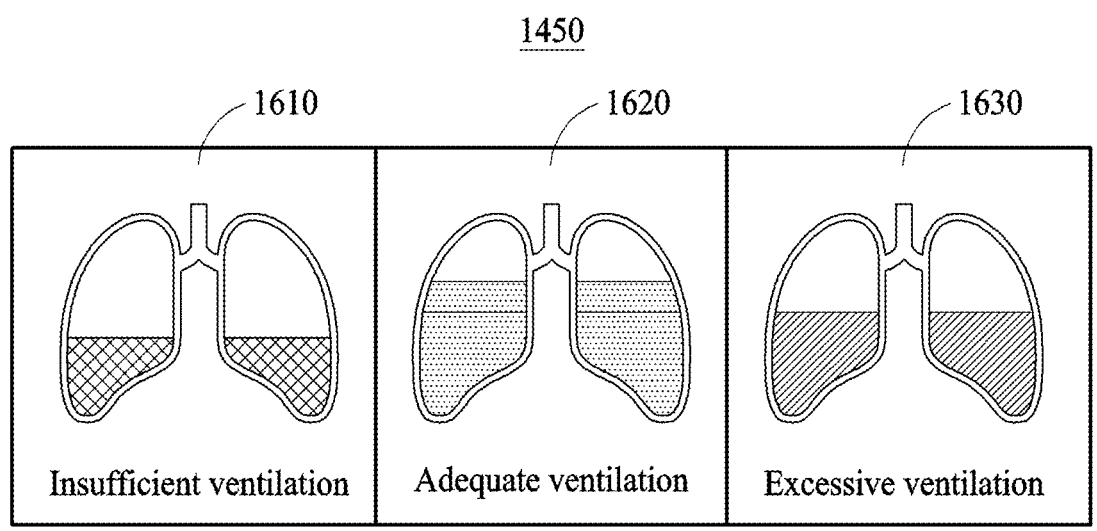
FIG. 16 illustrates an example of an artificial ventilation performance state index provided through a CPR training evaluation method according to an example embodiment.
Figure 17:
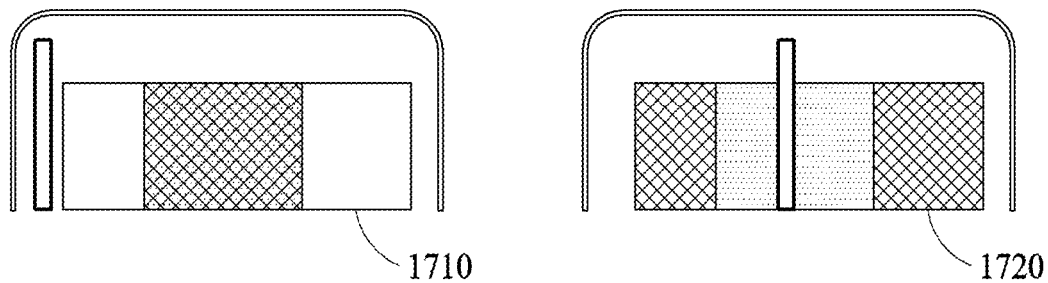
FIG. 17 illustrates an example of an artificial ventilation performance state index provided through a CPR training evaluation method according to an example embodiment.
Figure 18:
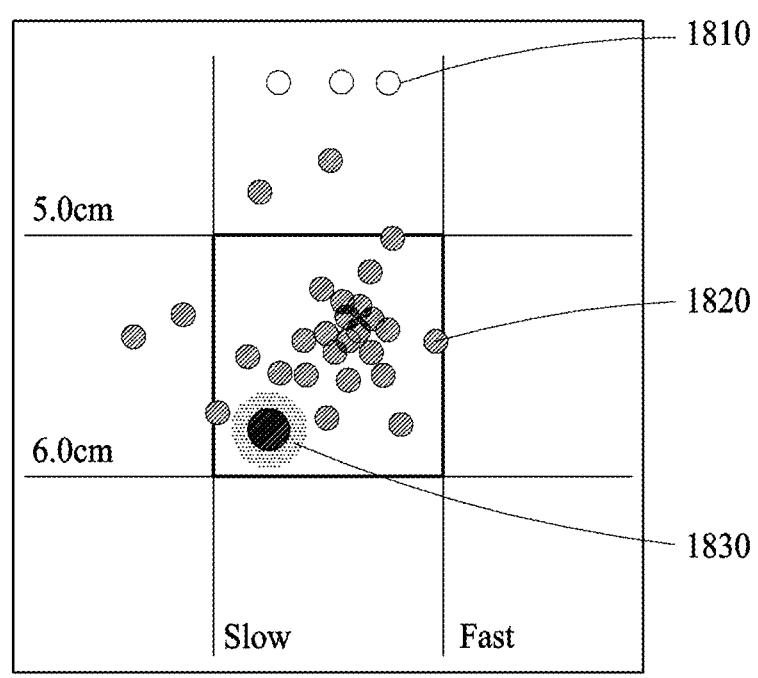
FIG. 18 illustrates an example of a chest compression distribution map provided through a CPR training evaluation method according to an example embodiment.

FIG. 11 is a flowchart illustrating a CPR training evaluation method according to an example embodiment, FIG. 12 is a flowchart illustrating an example of providing a CPR performance state according to an example embodiment, FIG. 13 is a flowchart illustrating an example of index conversion according to an example embodiment, FIG. 14 illustrates an example of a CPR performance state provided through the CPR training evaluation method according to an example embodiment, FIG. 15 illustrates an example of a chest compression performance state index provided through the CPR training evaluation method according to an example embodiment, FIG. 16 illustrates an example of an artificial ventilation performance state index provided through the CPR training evaluation method according to an example embodiment, FIG. 17 illustrates an example of an artificial ventilation performance state index provided through the CPR training evaluation method according to an example embodiment, and FIG. 18 illustrates an example of a chest compression distribution map provided through the CPR training evaluation method according to an example embodiment.

Referring to FIGS. 11 through 18, a CPR training evaluation method may evaluate an action performed by a user on a CPR training apparatus.

As shown in FIG. 11, the CPR training evaluation method may include operation 1110 of obtaining CPR action information, operation 1120 of providing a CPR performance state and operation 1130 of evaluating a CPR performance result.

In operation 1110, CPR action information related to a CPR action performed by a user on a CPR training apparatus may be obtained. Operation 1110 may include an operation of obtaining chest compression action information related to a chest compression action performed by the user on the CPR training apparatus and an operation of obtaining artificial ventilation action information related to an artificial ventilation action performed by the user on the CPR training apparatus. The chest compression action information may include information related to a position, a depth, a count, a rate, a frequency, and a hand-off interval of the chest compression performed by the user with respect to the CPR training apparatus. The artificial ventilation action information may include information related to an amount, a flow rate, an injection count, and an injection interval of air injected into the CPR training apparatus.

In operation 1120, a CPR performance state of the user may be monitored in real time based on the obtained action information.

As shown in FIG. 12, operation 1120 may include operation 1210 of quantifying the obtained action information, operation 1220 of classifying the quantified action information for each set item, and operation 1230 of converting the quantified action information into an index with respect to the CPR performance state and providing the index to the user.

In operation 1210, CPR action information related to a CPR action performed by a user may be quantified. For example, in operation 1210, an analog signal corresponding to the action being performed may be converted into a digital signal.

In operation 1220, the quantified action information may be classified for each set item. Classification items with respect to the action information may be changed based on a set condition. The classification items may include information, for example, a position of chest compression performed by the user on a CPR training apparatus, a depth of the chest compression, a rate of the chest compression, a count of the chest compression, a releasing level of the chest compression, a flow rate of air injected into the CPR training apparatus, an amount of artificial ventilation, a frequency of the artificial ventilation, and a count of the artificial ventilation. However, example embodiments are not limited thereto, and the classification items are not limited thereto.

In operation 1230, the quantified action information may be converted into an index with respect to the CPR performance state and provided to the user. In operation 1230, the index with respect to the CPR performance state may be generated using various schemes.

For example, as shown in FIG. 13, operation 1230 may include operation 1310 of recognizing a cycle, operation 1320 of converting operation information related to an operation performed in each cycle into an index, and operation 1330 of cumulatively providing the converted index.

In operation 1310, chest compression and artificial ventilation action information related to chest compression and artificial ventilation actions performed by the user on the CPR training apparatus may be obtained in real time, and a cycle for performing CPR may be recognized. The cycle may be recognized when the obtained CPR action information satisfies a preset condition. In general, CPR is performed through a series of actions, for example, 30 chest compressions and two artificial ventilations, per one cycle. Thus, in operation 1310, when artificial ventilation actions are sensed after chest compression actions are sensed through the CPR action information related to the CPR action performed by the user, it may be recognized that the user has performed one cycle of the CPR action. For example, the recognized cycle may be displayed as a cycle performance index 1420, as shown in FIG. 14.

In operation 1320, action information related to an action performed in the cycle may be converted into an index with respect to the CPR performance. In operation 1320, the action information may be converted into the index based on a set condition. For example, in operation 1320, a reference chest compression count for each cycle may be set. In detail, in a case in which the reference chest compression count for one cycle is set to "30", the obtained chest compression action information may be converted into an index with respect to a real chest compression count compared to the reference chest compression count, and provided as a compression count performance index 1410, in operation 1320.

Similarly, in operation 1320, a reference artificial ventilation count for one cycle may be set. For example, in a case in which the reference artificial ventilation count for one cycle is set to "2", the obtained artificial ventilation action information may be converted into an artificial ventilation frequency index 1460 and provided to the user, in operation 1320. However, example embodiments are not limited thereto, and the condition set for each cycle may vary.

In operation 1320, the quantified action information may be converted into a distribution map with respect to the depth and the rate of the chest compression and provided. For example, in operation 1320, a reference for the depth and the rate of the chest compression may be set and the obtained chest compression action information may be provided as an index displayed in a distribution map 1470 such that the obtained chest compression action information may be compared to the set reference. Thus, the user may receive a feedback that enables the user to verify whether the chest compression action performed by the user satisfies the set condition in real time.

In operation 1330, the converted index may be displayed cumulatively during the cycle. For example, in operation 1330, an index 1430 with respect to a CPR performing time, the index 1410 with respect to the cumulative chest compression count, or the index 1470 with respect to per-cycle compression record may be displayed based on the obtained action information.

Operation 1230 may further include an operation of initializing the converted index when the one cycle is terminated. In this example, in operation 1230, when sequential actions of chest compressions and artificial ventilations are performed again, it may be recognized that the existing cycle is terminated, and a new cycle is started. When a new cycle is started, the cumulative index of the existing cycle may be initialized. Thus, the CPR action performed by the user may be provided to the user separately for each cycle.

In operation 1230, the classed action information may be converted into a reach index with respect to a reference value of a set database and provided. For example, in operation 1230, a database with reference to a reference value for determining whether the CPR is performed adequately may be set, and a value of each action of the user may be converted into the reach index and provided such that the value of each action of the user may be compared to the reference value of the database. In detail, in operation 1230, a reach index 1440 with respect to the chest compression may be provided such that the user may verify whether the user is performing the chest compression action correctly, a reach index 1450 with respect to an amount of ventilation may be provided such that the user may verify whether an amount of ventilation in response to the artificial ventilation is adequate, or a reach index 1480 with respect to a compression position such that the user may verify whether the compression is performed at a correct position. However, example embodiments are not limited thereto. Various types of reference values and reach indices with respect to each action of CPR performed by the user may be applied thereto.

Indices with respect to the CPR performance state may be displayed on a screen of a display D of the evaluation apparatus. The indices may be displayed on the screen of the display D simultaneously as shown in FIG. 14 or may be displayed separately. Hereinafter, examples of indices indicating the CPR performance state according to the CPR training evaluation method will be described with reference to FIGS. 15 through 18.

As shown in FIG. 15, the reach index 1440 with respect to chest compression may include a chest compression depth index 1510, a chest compression release index 1520, a chest compression rate index 1530, an optimal chest compression depth index 1540, an excessive compression displaying index 1550, an excessive rate displaying index 1560, and an optimal compression displaying index 1570.

The index 1510 may indicate a compression depth in response to a chest compression action performed by the user in real time by changing a gradation based on a depth of the chest compression. The index 1520 may indicate whether an adequate release action is performed during the chest compression. The index 1530 may indicate whether a rate of the chest compression is less than a set reference. The index 1540 may indicate whether the depth of the chest compression satisfies a set reference. The index 1550 may indicate whether the depth of the chest compression exceeds the reference value. The index 1560 may indicate whether the rate of the chest compression exceeds a set reference. The index 1570 may indicate whether the depth and the rate of the chest compression satisfy the set conditions at the same time. A scheme and condition for providing the indices may be changed.

As shown in FIG. 16, the reach index 1450 with respect to the amount of artificial ventilation may indicate whether an amount of artificial ventilation performed by the user on the CPR training apparatus is adequate. For example, in a case in which the amount of artificial ventilation is insufficient, adequate, or excessive, the reach index 1450 with respect to the amount of ventilation may be changed as shown in each index 1610, 1620 or 1630, thereby displaying whether the amount of artificial ventilation is adequate in real time for the user.

As shown in FIG. 17, the index 1460 with respect to artificial ventilation frequency may be displayed in a manner that a gauge bar moves from an index 1710 to an index 1720 only when artificial ventilations of a set count are performed, through a count of artificial ventilations per one cycle performed by the user. Thus, whether the user is performing artificial ventilations at a correct frequency may be displayed in real time.

The index 1470 with respect to per-cycle compression record as shown in FIG. 18 may cumulatively provide whether a chest compression action performed by the user satisfies a set reference rate and a set compression depth in real time. The indices may be displayed separately to be distinguished from each other. For example, in the index 1470, a chest compression action not satisfying a reference may be indicated by an index 1810, and a chest compression action satisfying the reference may be indicated by an index 1820. Among indices with respect to chest compression actions, a most recently performed chest compression action may be indicated exaggeratively like an index 1830.

Figure 19:
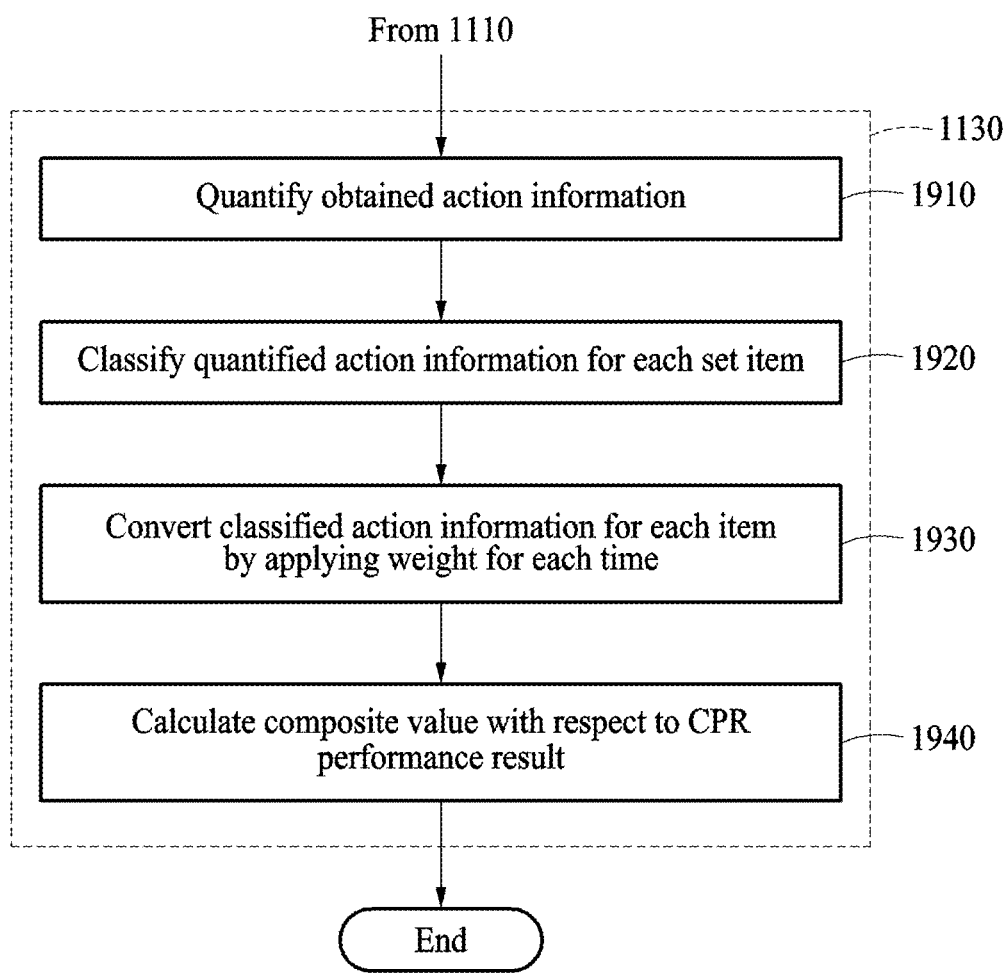
FIG. 19 is a flowchart illustrating an example of evaluating a CPR performance result according to an example embodiment.
Figure 20:
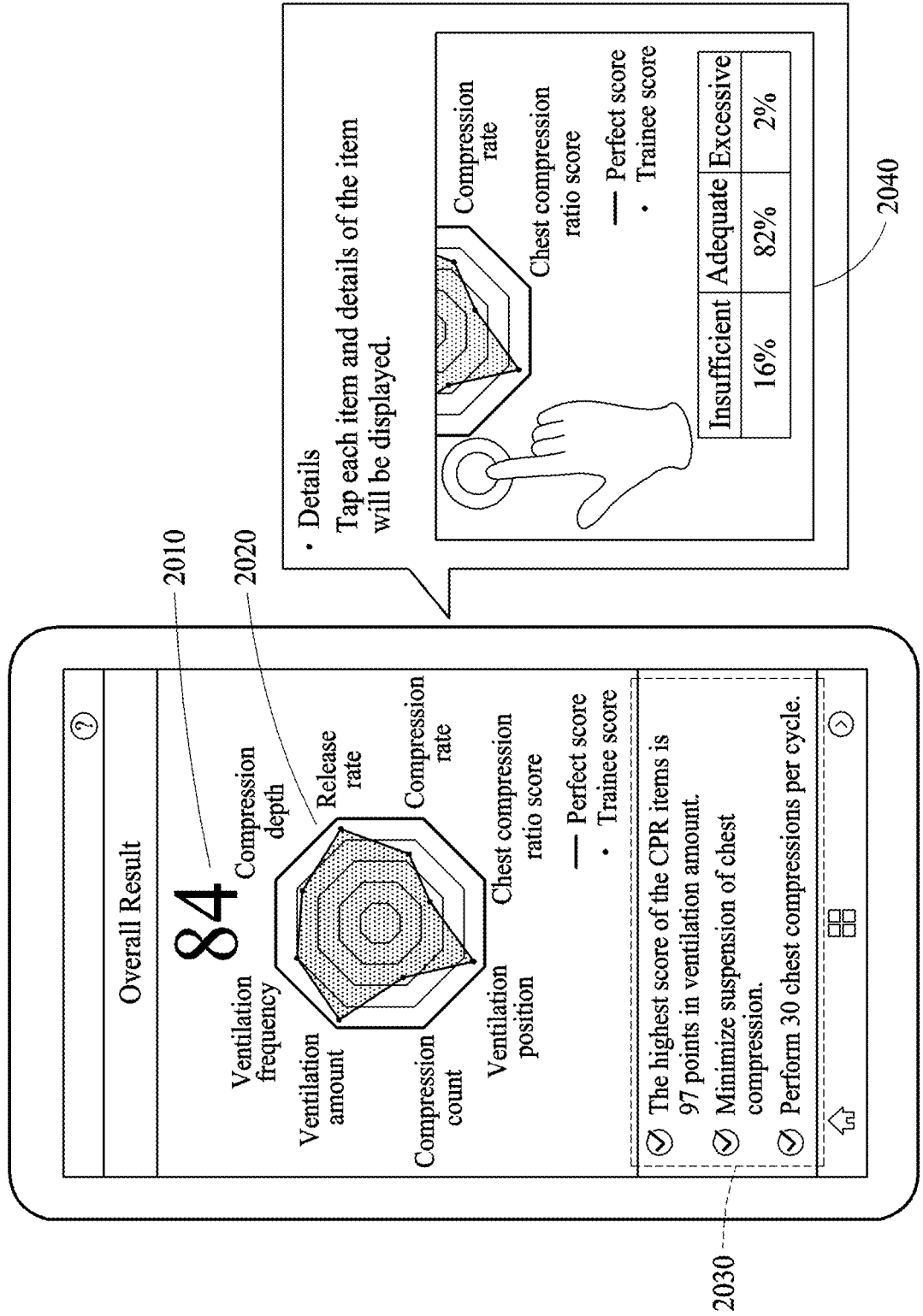
FIG. 20 illustrates an example of a CPR performance result provided through a CPR training evaluation method according to an example embodiment.
Figure 21:
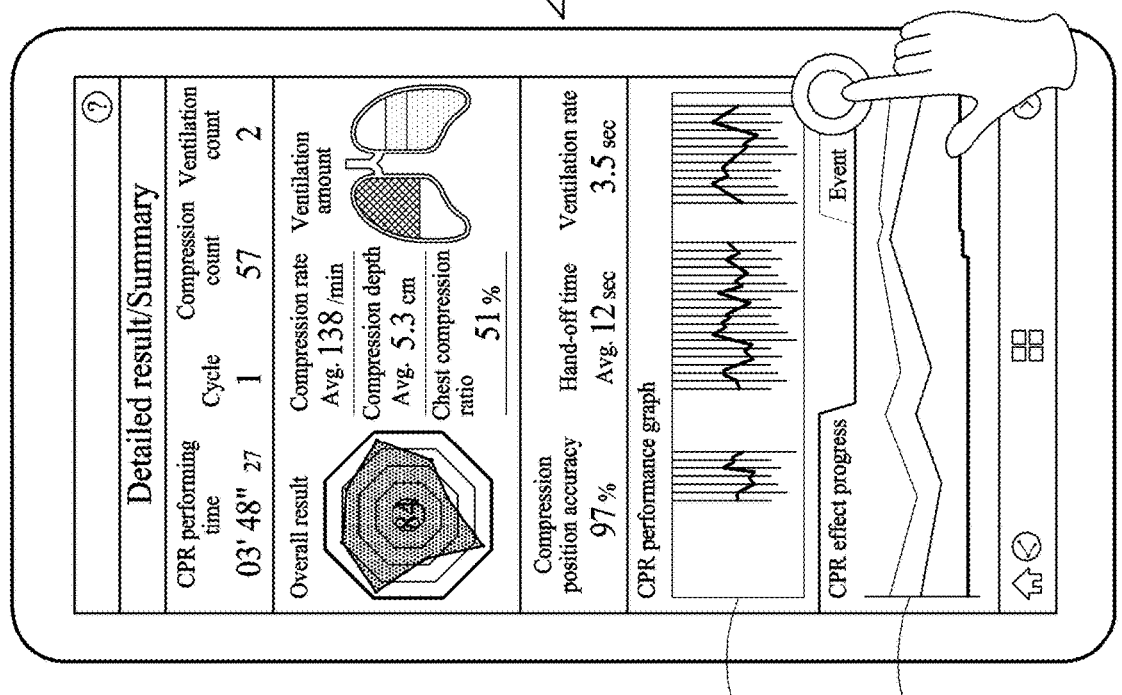
FIG. 21 illustrates an example of a CPR performance result provided through a CPR training evaluation method according to an example embodiment.
Figure 23:
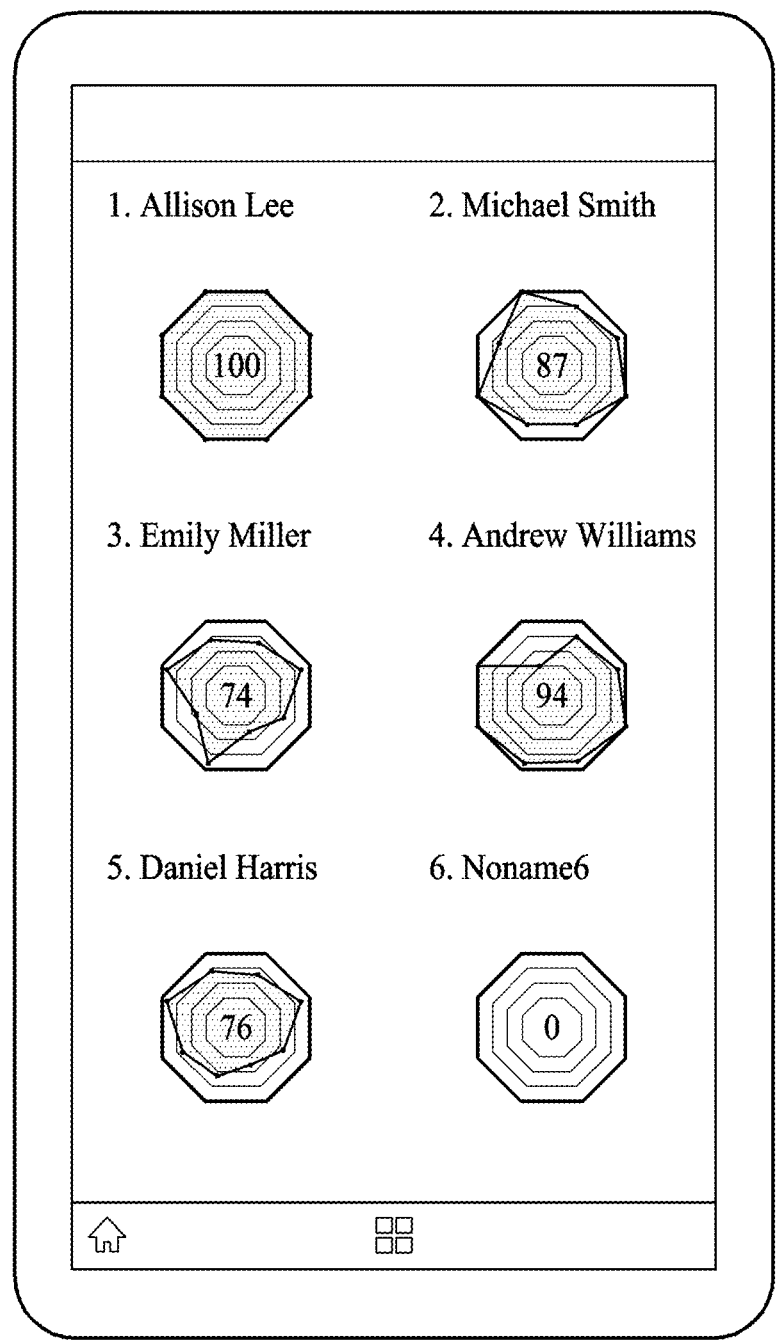
FIG. 23 illustrates an example of a CPR performance result provided through a CPR training evaluation method according to an example embodiment.

FIG. 19 is a flowchart illustrating an example of evaluating a CPR performance result according to an example embodiment, FIG. 20 illustrates an example of a CPR performance result provided through a CPR training evaluation method according to an example embodiment, FIG. 21 illustrates an example of a CPR performance result provided through the CPR training evaluation method according to an example embodiment, FIG. 22 illustrates an example of a CPR performance result provided through the CPR training evaluation method according to an example embodiment, and FIG. 23 illustrates an example of a CPR performance result provided through the CPR training evaluation method according to an example embodiment.

Referring to FIG. 19, in operation 1130 of evaluating a CPR performance result, an overall performance result with respect to the performed CPR may be evaluated after the CPR training action of the user is terminated. Operation 1130 may include operation 1910 of quantifying obtained action information, operation 1920 of classifying the quantified action information for each set item, operation 1930 of converting the classified action information for each item by applying a weight for each item, and operation 1940 of calculating a composite value with respect to the CPR performance result.

In operation 1910, action information related to an action performed by the user during the CPR training process may be cumulatively quantified.

In operation 1920, the quantified action information may be classified for each set item. For example, the action information may be classified into items such as a depth of chest compression, a releasing rate of chest compression, a rate of chest compression, a position of chest compression, a count of chest compression, an amount of artificial ventilation, and a frequency of artificial ventilation. However, example embodiments are not limited thereto, and the set items are not limited to the above examples.

In operation 1930, the classified action information may be converted by applying a weight to the action information for each set item. The weight may be set differently for each item. That is, a relatively high weight may be applied to a relatively important item among the plurality of items. For example, a higher weight may be applied to the depth of chest compression than the rate of chest compression.

In operation 1940, a composite value with respect to the CPR performance result may be calculated based on the converted action information for each item. For example, the composite value may be calculated in a form of score. In a case in which a different weight is applied to each item, the score of the composite value may increase when an action of an item having a relatively high weight is performed correctly.

Operation 1130 may further include an operation of selecting one of a plurality of modes, before operation 1910 of quantifying the obtained action information. For example, the plurality of modes may be provided based on a number of users performing CPR and conditions for a CPR target. In a case in which a single user performs CPR and in a case in which two users perform CPR, each user may perform a different CPR action on the CPR training apparatus, and thus a CPR training evaluation condition may be changed based on a corresponding mode.

Referring to FIG. 20, the CPR performance result may be provided with a score index 2010 with respect to an overall result, and a composite distribution chart 2020 with respective items. The user may intuitively verify a detailed analysis on a result of CPR performed by the user. The composite distribution chart 2020 may display whether a value of each item of the CPR action performed by the user reaches a reference value, thereby enabling the user to intuitively recognize a weak point of the user when performing the CPR action. The composite distribution chart 2020 may also display a detailed evaluation 2040 for each item.

Referring to FIG. 21, the CPR performance result may be provided in a form of time-course CPR performance graph 2110. The CPR performance graph 2110 may sequentially display information related to a series of actions performed by the user, for example, a depth of chest compression, a rate of chest compression, and an amount of artificial ventilation, as time passes.

Meanwhile, the CPR performance result may provide an expected effect of a CPR action performed by the user with a CPR effect progress graph 2120. The CPR effect progress graph 2120 may display an expected effect of chest compression and artificial ventilation actions performed by the user as time passes.

Further, the CPR performance result may display an action performed during CPR training of the user with an event list 2130. The event list 2130 may display whether an item required while performing CPR has been performed, for example, whether an action of checking responsiveness, an action of opening an airway, or an action of using a defibrillator has been performed.

Referring to FIG. 22, the CPR performance result may provide details of each item of a CPR action performed by the user. That is, a performance result of each classified action item may be provided separately. An evaluation on each action item may be determined based on a set criterion.

Referring to FIG. 23, the CPR training evaluation method may be performed concurrently through a plurality of CPR training apparatuses. In a case in which a plurality of CPR training apparatuses is provided, CPR actions performed on the respective training apparatuses may be evaluated separately. In this example, corresponding results may be provided through a single evaluation apparatus such that the results may be compared to each other.

According to embodiments, a CPR training apparatus and a CPR training evaluation method may display a CPR performance state of a user in real time, thereby providing a prompt feedback to the user.

According to embodiments, a CPR training apparatus and a CPR training evaluation method may intuitively provide a user with a CPR performance state based on a position and a depth of chest compression, thereby improving a CPR training effect of the user.

The effects of the CPR training apparatus and the CPR training evaluation method are not limited to the aforementioned effects and other effects not mentioned above will be clearly understood by those skilled in the art from the above description.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cardiopulmonary resuscitation (CPR) training apparatus, comprising:
    a mannequin including a head portion with an airway, and a body portion connected to the head portion;
    a compression portion provided in the body portion, the compression portion to be pressed in response to a chest compression;
    an airbag connected to the airway, the airbag configured to enable an artificial ventilation; and
    a measurer configured to measure a CPR performance state in response to the chest compression and the artificial ventilation performed on the mannequin.

2. The CPR training apparatus of claim 1, wherein the compression portion comprises:
    a compression plate provided in the body portion;
    an elastic body connected to the compression plate, the elastic body configured to provide a restoring force;
    a tilt detecting sensor installed on the compression plate, the tilt detecting sensor configured to detect a change in a tilt of the compression plate in response to the chest compression; and
    a position detecting sensor configured to detect a change in a relative position of the compression plate with respect to the body portion.

3. The CPR training apparatus of claim 2, further comprising:
    a magnetic substance and a magnetic field sensor configured to measure a change in a distance between the body portion and the compression plate in response to a change in a volume of the airbag.

4. The CPR training apparatus of claim 3, wherein the measurer is configured to:
    measure a position of the chest compression performed on the body portion through the tilt detecting sensor, and
    measure a rate and a depth of the chest compression performed on the body portion through the position detecting sensor.

5. The CPR training apparatus of claim 4, wherein the measurer is configured to:
    set a database determined based on the position and the depth of the chest compression performed on the body portion,
    obtain matching reference values by comparing a tilt value of the compression plate measured through the tilt detecting sensor and a position change value of the compression plate measured through the position detecting sensor to the database, and
    detect the position of the chest compression performed on the body portion based on the matching reference values.

6. The CPR training apparatus of claim 3, wherein the magnetic field sensor is disposed on the compression plate, and the magnetic substance is disposed on a front surface of the body portion,
    wherein the magnetic field sensor is configured to detect a change in a magnetic field in response to the change in the volume of the airbag, and
    the measurer is configured to measure a performance state of the artificial ventilation performed on the mannequin through the detected change in the magnetic field.

7. The CPR training apparatus of claim 1, further comprising:
    a contact protrusion provided on the compression plate, the contact protrusion configured to protrude toward a rear surface of the body portion; and
    a clicker disposed on an inner rear surface of the body portion, the clicker configured to produce a sound when in contact with the contact protrusion.

8. The CPR training apparatus of claim 1, further comprising:
    a communicator configured to transmit information measured by the measurer to an external server.

9. The CPR training apparatus of claim 1, further comprising:
    a display configured to display a virtual blood movement based on the CPR performance state,
    wherein the display comprises a light emitting line including a plurality of light emitting diodes (LEDs) configured to sequentially emit light based on the measured CPR performance state.

10. The CPR training apparatus of claim 9, wherein the light emitting line comprises:
    a compression depth displaying line disposed to extend from a chest of the body portion toward both shoulders of the body portion, the compression depth displaying line configured to display a virtual cardiac output corresponding to the depth of the chest compression; and
    a blood circulation displaying line disposed to circulate through the body portion and the head portion, the blood circulation displaying line configured to display a virtual blood circulation corresponding to a performance state of the chest compression.

* * * * *